T(12) United States Patent
Kimura et al.

(10) Patent No.: US 6,190,721 B1
(45) Date of Patent: Feb. 20, 2001

(54) SPREAD (75) Inventors: Osamu Kimura; Asuka Tajiri, both of Saitama; Yasuhiko Shiinoki; Masayuki Azuma, both of Tokyo, all of (JP)

(73) Assignee: Snow Brand Milk Products Co., Ltd., Hokkaido (JP)

( * ) Notice: Under 35 U.S.C. 154(b), the term of this patent shall be extended for 0 days.

(21) Appl. No.: 09/355,866

(22) PCT Filed: Dec. 2, 1998

(86) PCT No.: PCT/JP98/05418

§ 371 Date: Aug. 3, 1999

§ 102(e) Date: Aug. 3, 1999

(87) PCT Pub. No.: WO99/27797

PCT Pub. Date: Jun. 10, 1999

(30) Foreign Application Priority Data

Dec. 3, 1997 (JP) ........................................ 9-332998

(51) Int. Cl.$^7$ .................................................. A23D 7/015
(52) U.S. Cl. ........................ 426/604; 426/601; 426/603
(58) Field of Search .................... 426/601, 603, 426/604

(56) References Cited

U.S. PATENT DOCUMENTS

| | | | |
|---|---|---|---|
| 2,745,750 | * 5/1956 | Shafer | 426/603 |
| 4,540,593 | * 9/1985 | Moran | 426/604 |
| 4,772,483 | * 9/1988 | Nolte | 426/603 |
| 4,839,190 | * 6/1989 | Bunbalough | 426/603 |
| 4,960,606 | * 10/1990 | Crosby | 426/603 |
| 4,978,553 | * 12/1990 | Silver | 426/603 |
| 5,075,125 | * 12/1991 | Mongeau | 426/603 |
| 5,217,742 | * 6/1993 | Jones | 426/603 |
| 5,244,688 | * 9/1993 | Norton | 426/601 |
| 5,338,560 | * 8/1994 | Wesdorp | 426/603 |
| 5,656,323 | * 8/1997 | Underdown | 426/603 |
| 5,773,073 | * 6/1998 | Matsuda | 426/603 |

OTHER PUBLICATIONS

Clegg 1996 Low Fat Margarine Spread as Affected by Aqueous Phase Hydrocolloids J. Food Sc. 61(5) 1073.*

* cited by examiner

*Primary Examiner*—Carolyn Paden
(74) *Attorney, Agent, or Firm*—Knobbe, Martens, Olson & Bear, LLP (57) ABSTRACT

The invention provides a spread which contains phospholipids, has a 60% or less than 60% by weight oil phase, and exhibits an increase in conductivity at 36° C. to 0.2 mS/cm or more than 0.2 mS/cm in 300 seconds, and as such, forms a stable emulsion to produce a highly stable product, and when ingested, melts well and rapidly demulsifies to yield a sufficiently satisfying flavor.

9 Claims, 6 Drawing Sheets

SPREAD

This is a §371 application based on International patent application No. PCT/JP98/05418, filed Dec. 2, 1998, which claims priority based on Japanese Patent Application No. 332998/1997, filed Dec. 3, 1997.

FIELD OF THE INVENTION

The present invention relates to spread which melts well upon oral ingestion and rapidly demulsifies to yield a sufficiently-satisfying flavor.

BACKGROUND OF THE INVENTION

A national survey on nutrition in Japan conducted in 1995 revealed that fat consumption was rising and fat content as a percent of total calorie intake exceeded an appropriate level. This trend is attributed mainly to the Westernization of eating habits. Accordantly, heightened concerns about general health among the population is resulting in a growing demand for low-fat cheeses and cream, and other oil and fat products.

A spread is a type of fat composition produced by preparing a water-in-oil emulsion from a water phase and an oil phase, followed by cooling, solidifying, and agitating. Generally, a product with an oil-phase to water-phase ratio of more than 65% by weight is called a regular fat spread, while a product with a smaller oil-phase to water-phase ratio, in particular less than 40% by weight, is called a low-fat spread. Since oil and water are immiscible, in the production of the aforementioned spreads, the two layers are emulsified or dispersed to make a water-in-oil type emulsion.

However, certain emulsification or dispersion methods, or certain ratios of the two phases, have caused problems in manufacturing or have resulted in poor quality products. For example, a phase conversion occurs during emulsification or the subsequent pasteurization, cooling or solidification process, or the products have a coarse texture. These problems occur more often in the production of low-fat spreads in which higher water-phase to fat-phase ratio results in an unstable emulsion. This necessitated the addition of a highly effective emulsifier or a combination of large amounts of emulsifier and stabilizer. Consequently, conventional low-fat spread melts poorly in the mouth, do not demulsify, and do not yield a sufficiently-satisfying flavor through the mouth. Consumers have to date resisted these products because of these and other problems. Moreover, these problems are evident as well in regular-fat spreads.

The present invention is to solve the abovementioned problems found in the prior art. Namely, an objective of the present invention is to provide a spread which melts well in the mouth and demulsifies rapidly when ingested to yield a sufficiently-satisfying flavor; and for which these are no problems in manufacturing or with product quality.

DISCLOSURE OF THE INVENTION

The present inventors found that demulsification of a spread can be characterized by a change in conductivity, and accordingly, the conditions for the production of a spread which demulsifies well when ingested can be set by measuring the change in conductivity. Based on this finding, the present inventors did further research to obtain a spread with better demulsification properties, and found that better demulsification at oral temperatures could be achieved by the addition of phospholipids to the water phase. Thus, the present invention was completed.

A spread according to the present invention is characterized by that it contains phospholipids, has an oil phase at a level of 60% or less than 60% by weight, and exhibits an increase in conductivity at about 36° C. to at least 0.2 mS/cm within 300 seconds.

The concentration of phospholipids in a spread of the present invention is set so as to stabilize the emulsion and to attain an appropriate rate and state of demulsification. For example, preferably, the minimum concentration is 0.001% by weight and the maximum concentration is 1.0% by weight. Phospholipid concentrations of 0.001% or more than 0.001% by weight provide a better demulsification rate. Phospholipid concentrations of 1.0% or less than 1.0% by weight can provide a better emulsion stability by preventing phase conversion during emulsification, or in the subsequent pasteurizing, cooling or solidifying process.

The present invention provides a spread which melts well upon oral ingestion and rapidly demulsified to yield a sufficiently-satisfying flavor.

The present invention solves production problems such as phase conversion during emulsification, or in pasteurization or cooling process, and a lack of flavour in low-fat spreads. According to the invention, said spread can be obtained by the addition of a phospholipid to the water phase followed by emulsification with the oil phase, where the emulsifier is preferably a combination of a polyglycerol polyricinoleate and a monoglyceride, or a combination of a polyglycerol polyricinoleate, a monoglyceride and glycerol organic acid monoester.

BEST MODE OF CARRYING OUT THE INVENTION

Conductivity in the present invention is an index which indicates the ability of an aqueous electrolyte solution to conduct an electric current, and can be measured by an ordinary method. In the present invention, the spread is placed in deionized water and conductivity of the deionized water is measured. The change in conductivity occurs when the spread is demulsified, namely, when the emulsion is broken and electrolytes such as sodium chloride contained in its water phase are released into the deionized water. Thus, characteristics of the demulsification of the spread are assessed by measuring the change in conductivity.

Figure 1:
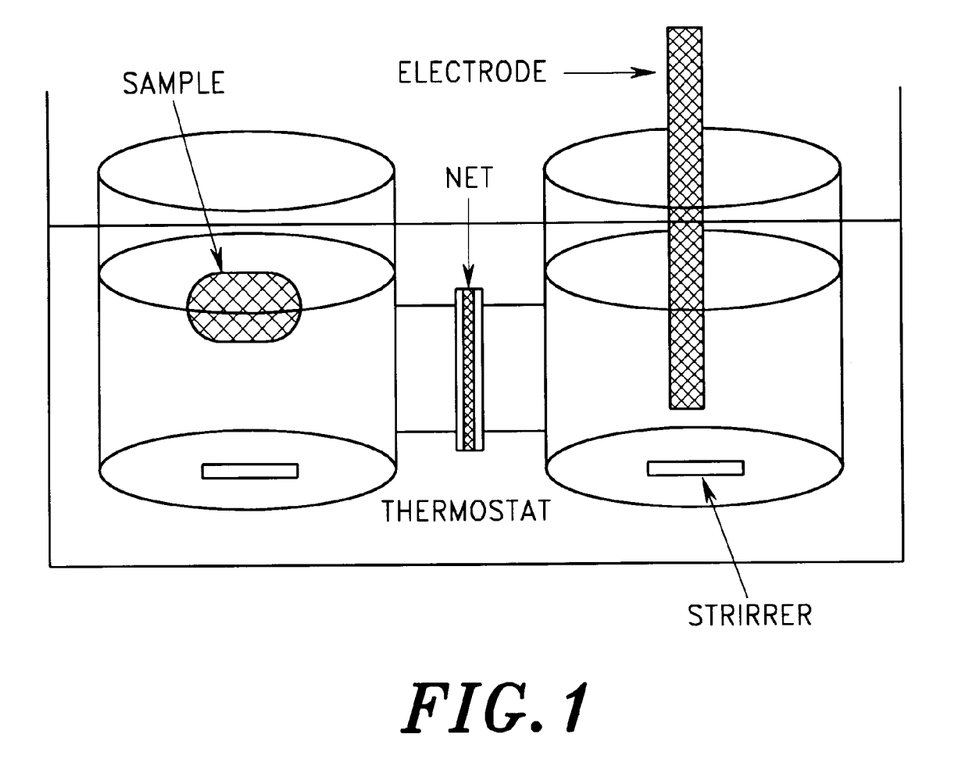
FIG. 1 shows an outline of the apparatus which can be used for the measurement of conductivity in the present invention.

FIG. 1 shows an example of the apparatus for the measurement of the change in conductivity for the assessment of the demulsification characteristics. Two beakers are connected via a net to avoid direct contact between a sample and an electrode, then the sample is added to deionized water at 36° C., i.e., the temperature virtually equivalent to the oral temperature. Conductivity increases with the release of electrolytes, such as sodium chloride (common salt) contained in the water phase of the sample, as the emulsion breaks. The measurement is carried out at close to 36° C., or normal body temperature (approximately 36° C., e.g., 35–37° C.), since that is the temperature at which the spread is preferably demulsified in order to melt well when ingested and to yield a sufficiently satisfying flavor.

Figure 2:
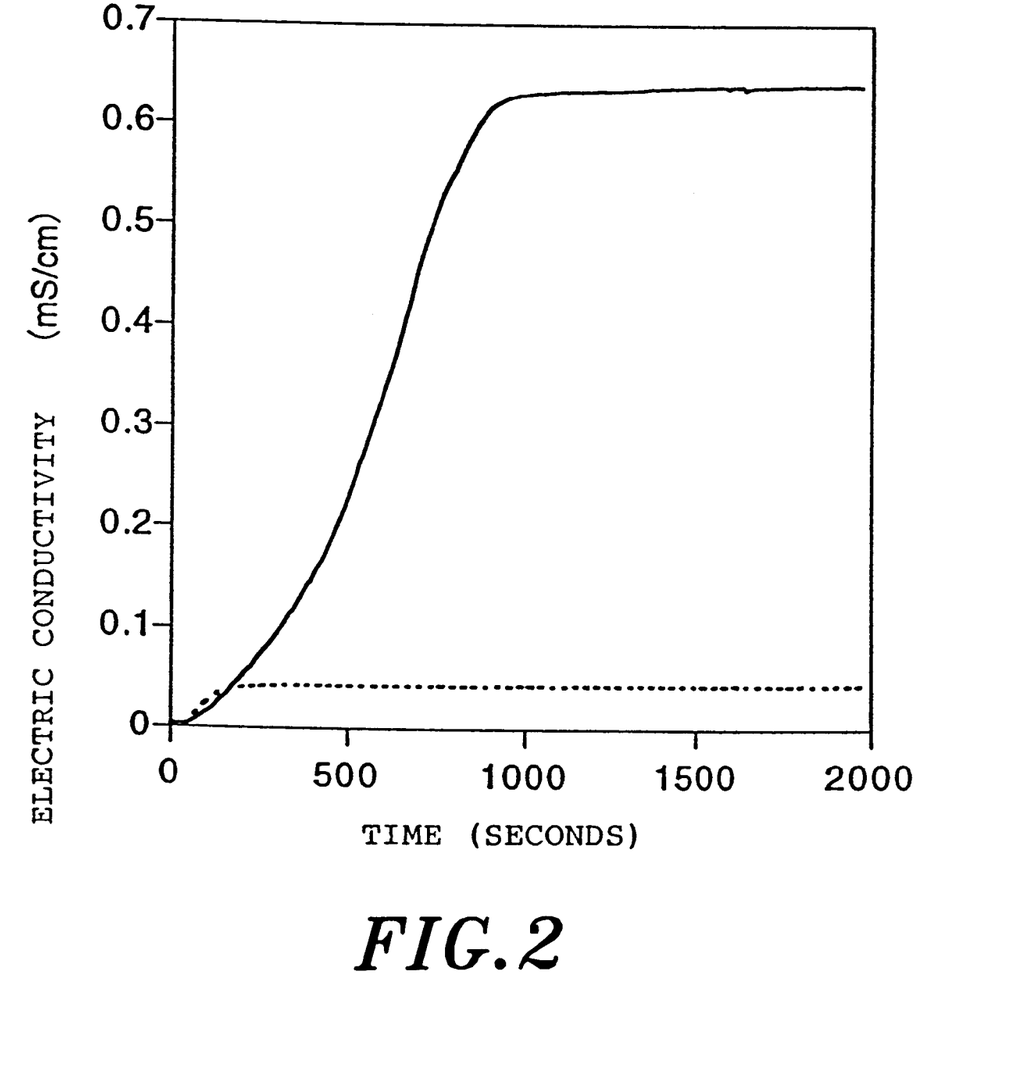
FIG. 2 shows the change in conductivity for a conventional spread. The solid line is for a conventional spread with a 70% by weight oil phase and the dotted line is for a conventional low-fat spread with a 40% by weight oil phase.

As shown by the sold line in FIG. 2, conductivity starts to increase at about 200 seconds, and then reaches 0.73 mS/cm at about 1000 seconds for a conventional spread with an oil phase of 65% or more than 65% by weight, for example, a spread with an oil phase of 70% by weight and a common salt content of 1.0%. On the other hand, as shown by the dotted line in FIG. 2, conductivity increases slightly at about 200 seconds then virtually levels off thereafter for a conventional spread with an oil phase of 40% by weight and a common salt content of 1.3%.

Since low-fat spread has a greater water-phase to oil-phase ratio than a regular spread, the use of the same type of emulsifiers, such as a monoglyceride (MG), employed for the production of a regular-fat spread, will result in a very poor emulsion or an unstable emulsion. Therefore, low-fat spreads are being manufactured using a polyglycerol condensed ricinoleic acid ester (PGPR) or the like, which are generally regarded to be strong emulsifiers. However, this strong emulsifying activity inherently means that the emulsion will not be easily broken when ingested, resulting in poor flavor. Accordingly, in order to solve this problem, a study was carried out on a low-fat spread having an oil phase of 40% by weight. As a result, it was revealed that for example, conductivity for a spread which was prepared by using 0.01–0.35% by weight PGPR and 0.3–0.8% by weight MG as emulsifiers, increased to more than 0.1 mS/cm within 300 seconds at near 36° C., indicating that the spread readily demulsified.

Figure 4:
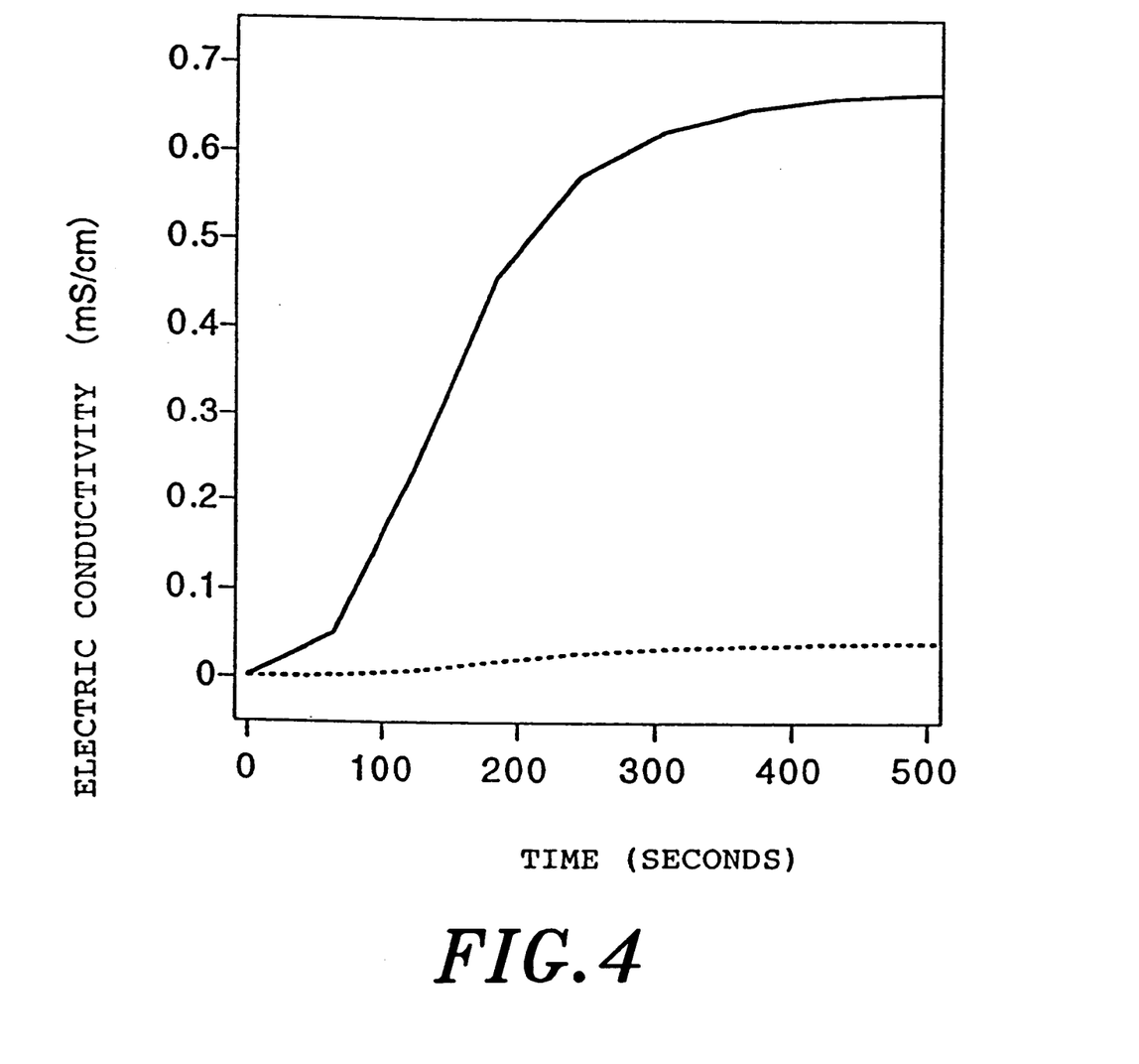
FIG. 4 shows the change in conductivity for the spreads obtained in Example 2 and Comparative Example 1. The solid line shows the change for Example 2 and the dotted line shows the change for Comparative Example 1.
Figure 5:
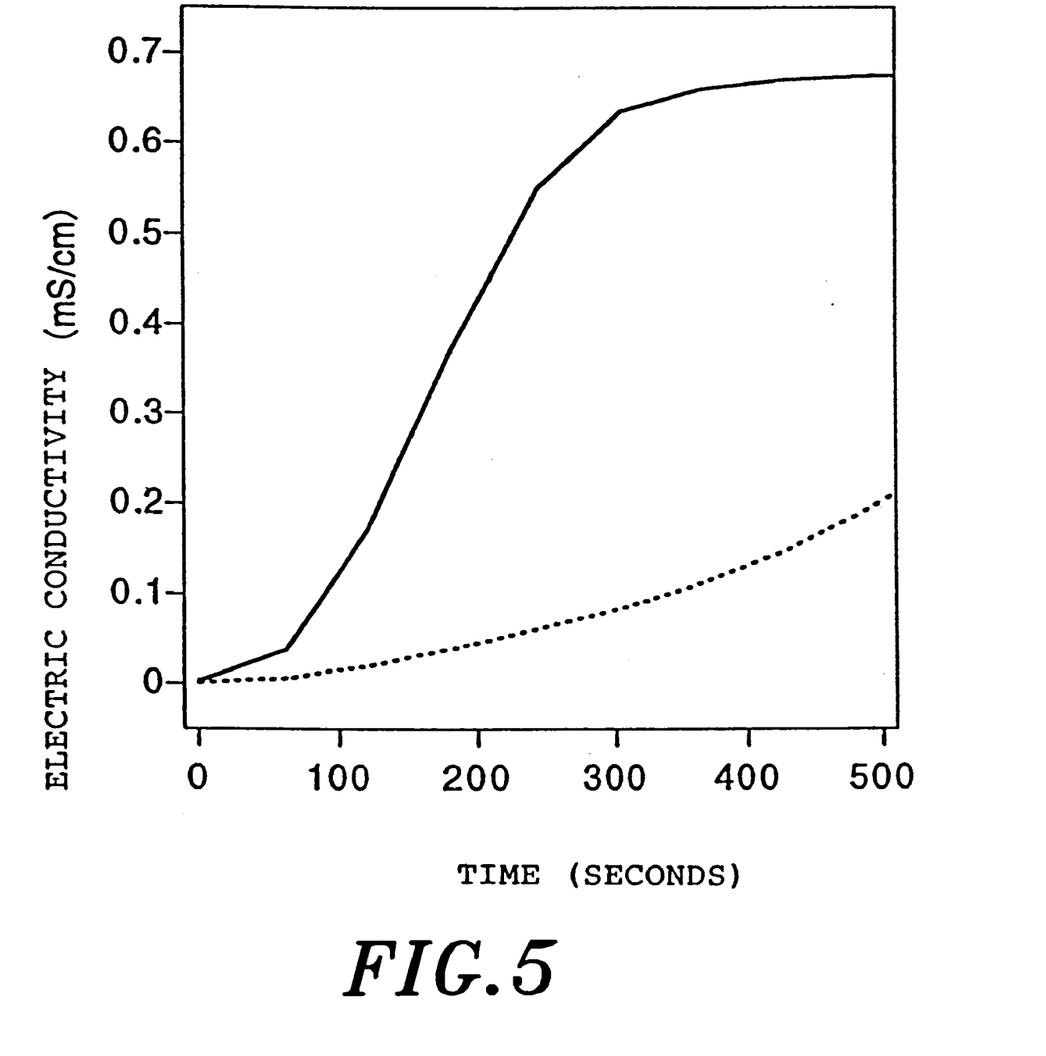
FIG. 5 shows the change in conductivity for the spreads obtained in Example 3 and Comparative Example 2. The solid line shows the change for Example 3 and the dotted line shows the change for Comparative Example 2.

Accordingly, the present inventors studied means to obtain a spread with much better demulsification properties, and found that the addition of a phospholipid to the water phase prior to emulsification with the oil phase using an appropriate emulsifier resulted in an increase in conductivity to 0.2 mS/cm or more than 0.2 mS/cm within 300 seconds at near 36° C. For example, when 2.0% by weight of a phospholipid-containing substance was first added to the water phase (corresponding to 1% by weight phospholipid), then emulsified with a 20% by weight oil phase using 0.5% by weight PGPR and 0.5% by weight MG as emulsifiers, the conductivity increased to at least 0.6 mS/cm within 300 seconds at near 36° C. (FIG. 4). Similarly, when 2.0% by weight of a phospholipid-containing substance was first added to the water phase (corresponding to 1% by weight phospholipid), then emulsified with a 60% by weight oil phase using 0.1% by weight PGPR and 0.4% by weight MG as emulsifiers, the conductivity increased to more than 0.6 mS/cm within 300 seconds at near 36° C. (FIG. 5). In both cases, the spread instantly demulsified when ingested.

Figure 6:
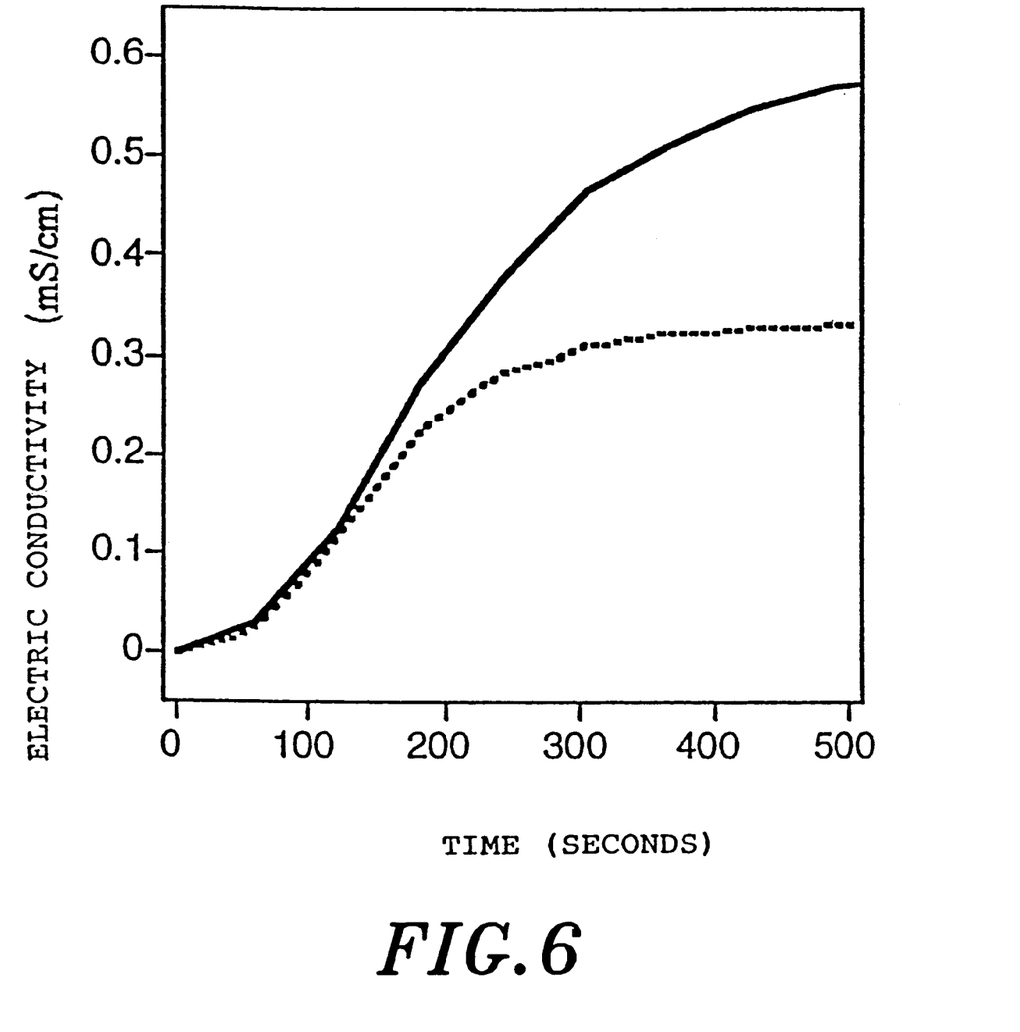
FIG. 6 shows the change in conductivity for the spreads obtained in Examples 4 and 5.

Furthermore, when a glycerol organic acid monoester was added in addition to PGPR and MG, conductivity for the resulting spread increased to at least 0.4 mS/cm within 300 seconds at near 36° C. (FIG. 6).

The present invention is based on these new findings.

The production of a spread of the present invention will be explained as follows. All processing steps per se in producing a spread of the present invention can be carried out according to known methods. For example, an oil phase component containing an emulsifier is first prepared, then a water phase component containing phospholipids is prepared. The water phase component is emulsified and dispersed into the oil phase component to make an emulsion. This emulsion can be appropriately pasteurized, cooled, rapidly solidified and agitated to obtain a spread.

Emulsifiers for use in the present invention are those which will stabilize an emulsion in a prescribed state but will then enable the spread to be suitably and quickly demulsified, and can be used in amounts as necessary without losing the desired flavor and other properties of the spread.

Examples of the emulsifiers include PGPRs (polyglycerol condensed ricinoleic acid esters) and MGs (monoglycerides). In particular, the use of PGPRs and MGs in combination is preferable. If used in combination, a minimum of 0.005% by weight and a maximum of 5% by weight PGPR and a minimum of 0.1% by weight and a maximum of 5% by weight MG is preferable.

Any PGPR which is used in producing an ordinary spread, such as condensed ricinoleic acid hexaglycerin ester, can be used. Any MG which is used in producing an ordinary spread, such as an unsaturated distilled monoglyceride, can be used.

Furthermore, when a glycerol organic acid monoester is used in addition to PGPR and MG, preferable percentages of these compounds in the emulsifier component are 0.1–1.0% by weight PGPR, 0.1–1.0% by weight MG and 0.03–0.5% by weight glycerol organic acid monoester.

Examples of the glycerol organic acid monoester include glycerol monocitrate, glycerol monosuccinate, glycerol diacetyltartarate, glycerol monolactate, and glycerol monoacetate. One or more of these compounds can be used as required. Preferable percentages of these compounds to be used are 0.03–0.05% by weight glycerol monocitrate, 0.05–0.2% by weight glycerol monosuccinate, 0.05–0.2% by weight glycerol diacetyltartarate, 0.1–0.3% by weight glycerol monolactate, and 0.1–0.5% by weight glycerol monoacetate.

The term "oil phase component" as used in the present invention means a component consisting of fats or oils and derivatives of fats or oils, such as those used in the production of an ordinary spread. Any fat and oil can be used provided it satisfies the quality requirement for an edible spread, including vegetable oils such as rapeseed oil, soybean oil, palm oil, corn oil, safflower oil, coconut oil and olive oil, animal fats and oils such as milk fat, fish oils, beef tallow and lard, and hydrolyzed fats thereof, transesterified oils, fractionated oils, and combinations thereof. The percentage of the oil phase component is 60% or less than 60% by weight, or slightly smaller than that for an ordinary spread, i.e., 65% by weight. This includes a so-called low-fat spread, but there is a minimum level so as to provide the characteristics of a spread, for example, which may be preferably 20% by weight.

The term "water phase component" as used in the present invention means a component consisting of water and water-soluble materials, such as those used in the production of an ordinary spread. Examples of the water soluble materials include dairy products such as raw milk, cow's milk, skimmed milk and skimmed milk powder, common salt and stabilizers. Dairy products are added to improve the flavor of the spread.

Common salt is added to provide an appropriate salty taste to the spread. The minimum amount to be added is, for example, 0.8% by weight, preferably, 1.0% by weight. The maximum amount to be added is 1.5% by weight, preferably, 1.3% by weight.

A stabilizer is added to prevent the separation of water and to stabilize the texture, particularly in the production of a low-fat spread having a less than 40% by weight oil phase component. For example, thickening polysaccharides, such as guar gum and xanthan gum, or gelatin can be used alone or in combination. Of these stabilizers, gelatin is preferably used in an amount preferably ranging from 0.5% by weight to 5% by weight.

In the present invention, phospholipids is added to the water phase. Examples of phospholipids include soybean lecithin, egg yolk lecithin and enzyme-treated materials thereof, as well as milk substances containing phospholipids derived from milk, such as milk serum powder, butter milk powder and powders rich in complex lipids derived from milk (Japanese Patent Laid-open (Kokai) No. 292880/93). When milk substances are used, it is preferable to use those which contain phospholipids derived from milk in an amount of 1% or more than 1% by weight of the total milk substances. Moreover, milk substances should preferably added in an amount such that the phospholipid content in the spread will be from 0.001–1.0% by weight, more preferably from 0.05–0.5% by weight. A better demulsification rate (increasing conductivity rate) can be attained by an addition of more than 0.001% by weight. Furthermore, phase conversion during its production procedure, for example, during the pasteurization, cooling or solidification process, can be effectively prevented; and the emulsion can be better stabilized for storage by an addition of 1.0% or less than 1.0% by weight. The abovementioned milk serum powder can be obtained by centrifuging raw milk to separate the cream, further centrifuging the cream, concentrating the resulting isolated water phase component, then spray-drying the resulting concentrate. A commercially available milk serum powder can also be used. A powder rich in complex lipids can be prepared according to the method described in Japanese Patent Laid-open (Kokai) No. 292880/93. In addition to these milk substances, which contains 1% or more than 1% phospholipids derived from milk, cow's milk, raw milk or the like can also be used. These materials can be added to the water phase such that the specified amount of phospholipids is included in the spread by appropriately adjusting the water content of the water phase.

Conductivity will be affected by the composition of phospholipid-containing milk substances being added to the water phase. For example, the conductivity increases to 0.2 mS/cm or more than 0.2 mS/cm at about 300 seconds if the ash content is high while the conductivity increases to 0.6 mS/cm or more than 0.6 mS/cm at about 300 seconds if the ash content is relatively low, even when the phospholipid content of milk serum powder is more than 1% by weight.

The spread thus obtained is characterized in that it has an oil phase of 60% or less than 60% by weight and exhibits an increase in conductivity at about 36° C. to 0.2 mS/cm or more than 0.2 mS/cm within 300 seconds. The conductivity can be measured using an electrode (HORIBA 3582-10D) and a conductivity meter (HORIBA ES-12). As shown in FIG. 1, two beakers are connected via a net to avoid contact between the sample and the electrode, 10 g of a sample are added to 400 g of deionized water at 36° C., i.e., virtually equivalent to the oral temperature, then the conductivity of the deionized water is measured. The temperature of the deionized water in the container is maintained at 36° C. using a thermostatic bath (Tokyo Rika Machine, PCC-7000), and the deionized water is stirred using a stirrer at about 120 rpm. The change in conductivity with time is read using a voltmeter (HP3852A) and the calculated value is expressed as mS/cm. A preferable sample temperature is 5–10° C. Preferably, frozen samples are allowed to stand for a while at room temperature to attain the abovementioned range of temperature before measurement. The presence of salt in the water phase is essential since the conductivity is measured by the release of salt from the water phase of the spread. Since a spread generally contains about 1% by weight salt, a salt content of 1% or close to 1% by weight is sufficient for measurement. The spread of the present invention demulsifies at about 36° C., wherein the salt contained in the water phase of the spread is released into the deionized water and the conductivity increases. In this manner, flavor and other components and salt from the water phase are released together upon demulsification at near 36° C. to impart a sufficiently satisfying flavor when ingested.

The common salt concentration of the spread of the present invention is not restricted to that used for the conductivity measurement and can be changed as desired. Namely, specified salt concentrations can be used to prepare samples for the conductivity measurement while desired salt concentrations can be used to prepare food products.

The following examples explain the present invention more in detail.

EXAMPLE 1

The following ingredients were used to prepare low-fat spread samples having a 20% by weight oil phase component.

TABLE 1

| | | Concentration (% by weight) | | |
|---|---|---|---|---|
| Ingredients | | Sample No. 1 | Sample No. 2 | Sample No. 3 |
| Oil phase | Soybean oil and hydrogenated soybean oil mixture | 19.0 | 19.0 | 19.0 |
| | PGPR[1] | 0.5 | 0.5 | 0.5 |
| | MG[2] | 0.5 | 0.5 | 0.5 |
| Water phase | milk serum powder | 0.005 | 4.0 | 8.0 |
| | (as phospholipids) | (0.000625) | (0.5) | (1.0) |
| | Gelatin | 2.0 | 2.0 | 2.0 |
| | Common salt | 1.3 | 1.3 | 1.3 |
| | Water | 76.695 | 72.7 | 68.7 |

[1]PGPR: condensed ricinoleic acid hexaglycerin ester
[2]MG: Unsaturated distilled monoglyceride First, an emulsifier was added to oil and fat materials and the admixture was stirred while maintaining the temperature at 60° C. to dissolve the emulsifier and produce an oil phase component. Next, common salt, gelatin and milk serum powder (containing 12.5 by weight phospholipids) as a milk substance containing phospholipids derived from milk were added to water at a concentration of 0.005% by weight, 4.0% by weight, and 8.0% by weight, respectively, and the admixture was dissolved to prepare three kinds of water phase components. Each water phase component was added to an oil phase component with stirring for emulsification. The resulting emulsion was heated to 85° C. for pasteurization, then cooled to 40° C. using water. The emulsion was cooled to 10° C. and agitated using a combinator as a quenching and molding press to obtain three kinds of spread (Samples 1, 2 and 3).

The resulting spread samples with three different levels of phospholipid content were stored at 5° C., then the conductivity was measured at 36° C.

For the measurement of the conductivity, as shown in FIG. 1, two beakers were placed in the thermostatic bath (Tokyo Rika Machine PCC-7000) and connected via a net to avoid contact with the electrode (HORIBA 3582-10D). A stirrer was placed at the bottom of the water bath. The temperature of the deionized water (400 g) in the beakers was maintained at 36° C. A sample (10 g) was placed in one beaker and the electrode was inserted into the other beaker. While stirring at about 120 rpm using a stirrer, the change in conductivity with time was monitored using a voltmeter (HP3852A) and the calculated value was expressed as mS/cm. Results are shown in FIG. 3.

Figure 3:
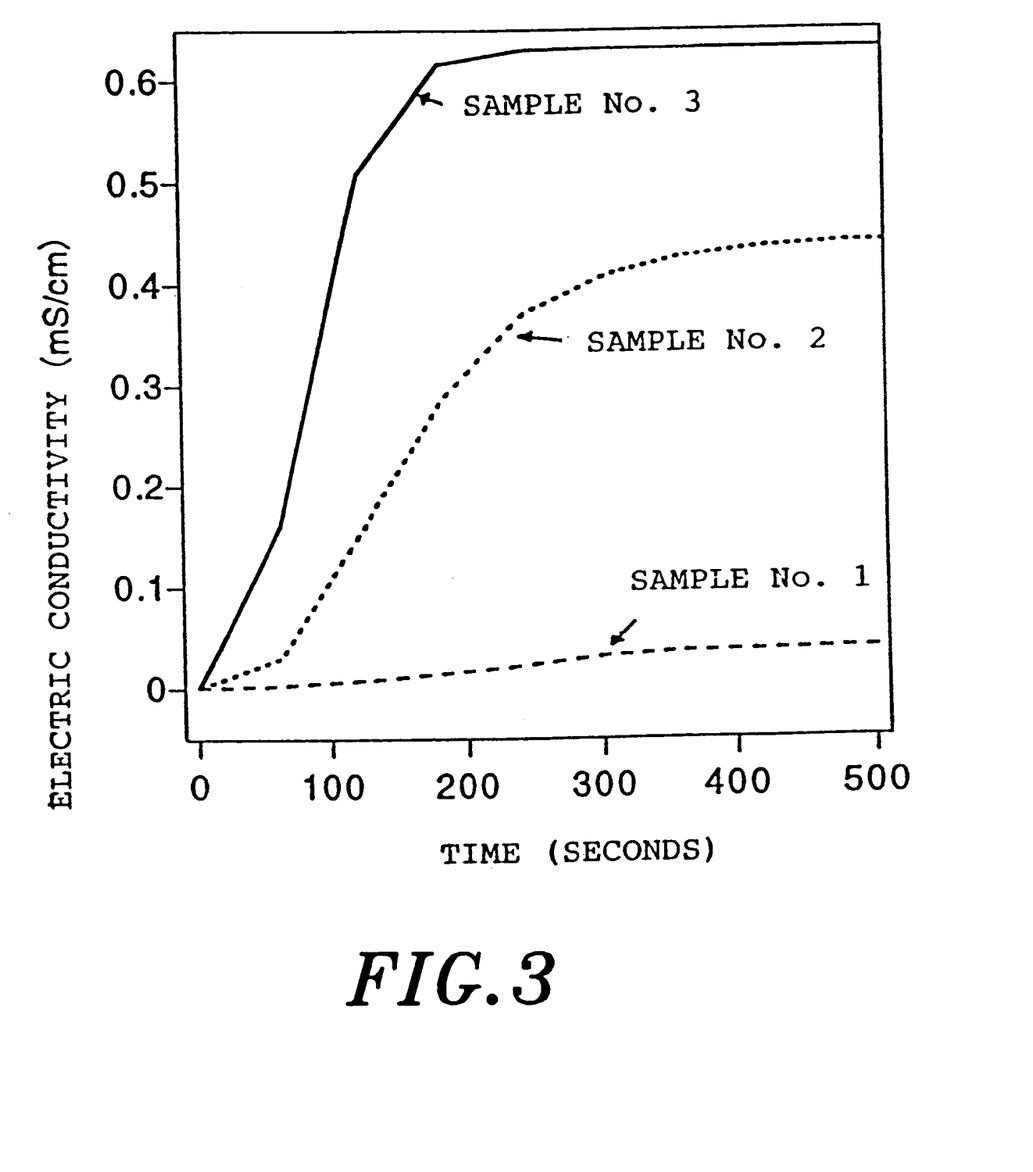
FIG. 3 shows the change in conductivity for a low-fat spread in which milk serum powder is added at the level of 0.005%, 4.0% or 8.0% by weight.

As shown in FIG. 3 with samples 2 and 3, the conductivity increased to at least 0.4 mS/cm in 300 seconds indicating good demulsification at the oral temperature. On the other hand, with sample 1, there was no increase in the conductivity indicating no demulsification at the oral temperature.

EXAMPLE 2

The ingredients shown in Table 2 were used to prepare a low-fat spread sample having a 20% by weight oil phase.

First, an emulsifier was added to oil and fat materials and the admixture was stirred maintaining the temperature at 60° C. to dissolve the emulsifier and produce the oil phase component. Next, common salt, gelatin and milk serum powder (containing 12.5% by weight phospholipids) as a milk substance containing phospholipids derived from milk were added to water, and the admixture was dissolved to prepare a homogeneous water phase component. The water phase component was added to an oil phase component with stirring for emulsification. The resulting emulsion was heated to 85° C. for pasteurization, then cooled to 40° C. using water. The emulsion was cooled to 10° C. and agitated using a combinator as a quenching and molding press to obtain the spread sample.

TABLE 2

| Ingredients | | Concentration (% by weight) |
|---|---|---|
| Oil phase | Soybean oil and hydrogenated soybean oil mixture | 19.0 |
| | PGPR[1] | 0.5 |
| | MG[2] | 0.5 |
| Water phase | milk serum powder | 2.0 |
| | Gelatin | 2.0 |
| | Common salt | 1.3 |
| | Water | 74.7 |

[1]PGPR: condensed ricinoleic acid hexaglycerin ester
[2]MG: Unsaturated distilled monoglyceride

COMPARATIVE EXAMPLE 1

The ingredients shown in Table 3 were used to prepare a low-fat spread sample having a 20% by weight oil phase. The preparation was carried out as described in Example 2.

TABLE 3

| Ingredients | | Concentration (% by weight) |
|---|---|---|
| Oil phase | Soybean oil and hydrogenated soybean oil mixture | 19.0 |

TABLE 3-continued

| Ingredients | | Concentration (% by weight) |
|---|---|---|
| | PGPR[1] | 0.5 |
| | MG[2] | 0.5 |
| Water phase | Gelatin | 2.0 |
| | Common salt | 1.3 |
| | Water | 76.7 |

[1]PGPR: condensed ricinoleic acid hexaglycerin ester
[2]MG: Unsaturated distilled monoglyceride Spread samples obtained in Example 2 and Comparative Example 1 were stored at 5° C., then the conductivity was measured at 36° C. The measurement was carried out as described in Example 1. As shown in FIG. 4, the sample obtained in Example 2 (shown with a solid line) exhibited an increase in conductivity to at least 0.6 mS/cm in 300 seconds indicating good demulsification at the oral temperature. On the other hand, the sample obtained in Comparative Example 1 (shown with a dotted line) exhibited no increase in conductivity indicating no demulsification at the oral temperature.

EXAMPLE 3

The ingredients shown in Table 4 were used to prepare a spread sample having a 60% by weight oil phase. The preparation was carried out as described in Example 2. An added milk substance containing phospholipids derived from milk (containing 1% by weight phospholipids) was prepared by a method described in Japanese Patent Laid-open (Kokai) No. 292880/93.

TABLE 4

| Ingredients | | Concentration (% by weight) |
|---|---|---|
| Oil phase | Soybean oil and hydrogenated soybean oil mixture | 59.5 |
| | PGPR[1] | 0.1 |
| | MG[2] | 0.4 |
| Water phase | Milk substance containing phospholipids derived from milk | 2.0 |
| | Common salt | 1.3 |
| | Water | 36.7 |

[1]PGPR: condensed ricinoleic acid hexaglycerin ester
[2]MG: Unsaturated distilled monoglyceride

COMPARATIVE EXAMPLE 2

The ingredients shown in Table 5 were used to prepare a spread sample having a 60% by weight oil phase. The preparation was carried out as described in Example 2.

TABLE 5

| Ingredients | | Concentration (% by weight) |
|---|---|---|
| Oil phase | Soybean oil and hydrogenated soybean oil mixture | 59.5 |
| | PGPR[1] | 0.1 |
| | MG[2] | 0.4 |
| Water phase | Common salt | 1.3 |
| | Water | 38.7 |

[1]PGPR: condensed ricinoleic acid hexaglycerin ester
[2]MG: Unsaturated distilled monoglyceride Spread samples obtained in Example 3 and Comparative Example 2 were stored at 5° C., then the conductivity was measured at 36° C. Results are shown in FIG. 5. As shown in FIG. 5, the sample obtained in Example 3 (shown with a solid line) exhibited an increase in conductivity to at least 0.6 mS/cm in 300 seconds indicating good demulsification at the oral temperature. On the other hand, the sample obtained in Comparative Example 2 (shown with a dotted line) exhibited no increase in conductivity indicating no demulsification at the oral temperature.

EXAMPLES 4 AND 5

The ingredients shown in Table 6 were used to prepare two kinds of spread samples having a 20% by weight oil phase and with and without the addition of glycerol organic acid monoester. The preparation was carried out as described in Example 2.

TABLE 6

| Ingredients | | Concentration (% by weight) | |
|---|---|---|---|
| | | Example 4 | Example 5 |
| Oil phase | Soybean oil and hydrogenated soybean oil mixture | 18.95 | 19.0 |
| | PGPR[1] | 0.5 | 0.5 |
| | MG[2] | 0.5 | 0.5 |
| | Glycerol organic acid monoester[3] | 0.05 | — |
| Water phase | milk serum powder (0.0625% by weight as phospholipids) | 0.5 | 0.5 |
| | Gelatin | 2.0 | 2.0 |
| | Common salt | 1.3 | 1.3 |
| | Water | 76.2 | 76.2 |

[1]PGPR: condensed ricinoleic acid hexaglycerin ester
[2]MG: Unsaturated distilled monoglyceride
[3]Glycerol organic acid monoester: glycerol monosuccinate Spread samples obtained in Examples 4 and 5 were stored at 5° C., then the conductivity was measured at 36° C. Results are shown in FIG. 6. As shown in FIG. 6, the sample with the glycerol organic acid monoester in Example 4 (shown with a solid line) exhibited a faster increase in conductivity reaching at least 0.4 mS/cm in 300 seconds indicating better demulsification at the oral temperature than the sample without glycerol organic acid monoester in Example 5 (shown with a dotted line).

What is claimed is:

1. A spread characterized in that it contains phospholipids in amount of 0.001% to 1.0% by weight, has an oil phase of 60% or less than 60% by weight, and exhibits an increase in conductivity at near 36° C. to 0.2 mS/cm or more than 0.2 mS/cm in 300 seconds.

2. A spread according to claim 1 wherein the oil phase is 20% or more than 20% by weight.

3. A spread according to claim 1 characterized in that it contains a 0.005–5% by weight polyglycerol polyricinoleate and a 0.1–5% by weight monoglyceride as emulsifiers.

4. A spread according to claim 1, characterized in that it contains a 0.1–1.0% by weight polyglycerol polyricinoleate, a 0.1–1.0% by weight monoglyceride and a 0.03–0.5% by weight glycerol organic acid monoester and exhibits an increase in conductivity at 36° C. to more than 0.4 mS/cm in 300 seconds.

5. An emulsion spread comprising: (a) an oil phase which is no more than 60% by weight, (b) a water phase to which phospholipids are added in an amount of 0.001% to 1.0% by weight to exhibit an increase in conductivity of the spread to no less than 0.2 mS/cm as measured when placed in deionized water at near 36° C. for 300 seconds, and (c) an emulsifier.

6. The spread according to claim 5 wherein the oil phase is no less than 20% by weight.

7. The spread according to claim 5, wherein the emulsifier comprises 0.005–5% by weight of polyglycerol polyricinoleate and 0.1–5% by weight of monoglycerides at 36° C. for 300 seconds based on the weight of the spread.

8. The spread according to claim 5, wherein the emulsifier comprises 0.1–1.0% by weight of polyglycerol polyricinoleate, 0.1–1.0% by weight of monoglyceride, and 0.03–0.5% by weight of glycerol organic acid monoester based on the weight of the spread.

9. The spread according to claim 8, which exhibits an increase in conductivity of more than 0.4 mS/cm as measured when placed in deionized water.

* * * * *